United States Patent
Yu et al.

(10) Patent No.: US 9,280,008 B2
(45) Date of Patent: Mar. 8, 2016

(54) BACKLIGHT MODULE AND LIQUID CRYSTAL DISPLAY DEVICE USING SAME

(71) Applicant: Shenzhen China Star Optoelectronics Technology Co., Ltd., Shenzhen, Guangdong (CN)

(72) Inventors: Gang Yu, Shenzhen (CN); Yuchun Hsiao, Shenzhen (CN); Shihhsiang Chen, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 235 days.

(21) Appl. No.: 14/126,431

(22) PCT Filed: Nov. 12, 2013

(86) PCT No.: PCT/CN2013/086912
§ 371 (c)(1),
(2) Date: Dec. 15, 2013

(87) PCT Pub. No.: WO2015/062122
PCT Pub. Date: May 7, 2015

(65) Prior Publication Data
US 2015/0116627 A1    Apr. 30, 2015

(30) Foreign Application Priority Data
Oct. 30, 2013  (CN) .......................... 2013 1 0530001

(51) Int. Cl.
*G02F 1/1337* (2006.01)
*G02F 1/1333* (2006.01)
(Continued)

(52) U.S. Cl.
CPC ........ *G02F 1/133308* (2013.01); *G02B 6/0055* (2013.01); *G02B 6/0068* (2013.01);
(Continued)

(58) Field of Classification Search
CPC ........................ G02F 1/133615; G02B 6/0068
See application file for complete search history.

(56) References Cited

U.S. PATENT DOCUMENTS

| 5,654,779 | A | 8/1997 | Nakayama et al. |
| 7,609,355 | B2 * | 10/2009 | Nouchi ................. G02F 1/1333 349/113 |

(Continued)

FOREIGN PATENT DOCUMENTS

| CN | 2606373 Y | 3/2004 |
| CN | 101487943 A | 7/2009 |

*Primary Examiner* — Phu Vu
(74) *Attorney, Agent, or Firm* — Andrew C. Cheng

(57) ABSTRACT

The present invention provides a backlight module and a liquid crystal display device using the backlight module. The backlight module includes: a backplane (2), a light guide plate (4) arranged in the backplane (2), a backlight source (6) arranged in the backplane (2), and an optic film assembly (8) arranged on the light guide plate (4). The backplane (2) comprises a bottom plate (22) and a plurality of side plates (24) perpendicularly connected to the bottom plate (22). The bottom plate (22) has a surface facing the light guide plate (4) and defining a curved surface (222) and the curved surface (222) comprises a curved reflection surface (224) formed thereon. The backlight module and the liquid crystal display device using the backlight module according to the present invention have simple structure and include a backplane having a bottom plate that has a surface facing the light guide plate and including a curved reflection surface having excellent reflectivity formed thereon to replace a conventionally used reflector plate so as to reduce the thickness of the liquid crystal display device, reduce the cost of manufacturing, and facilitate achievement of thinning and also preventing the light guide plate from damage caused by friction between the reflector plate and the light guide plate and thus extending the life span of the light guide plate.

13 Claims, 3 Drawing Sheets

(51) Int. Cl.
  *G02F 1/1335* (2006.01)
  *F21V 8/00* (2006.01)
(52) U.S. Cl.
  CPC ........ *G02B6/0088* (2013.01); *G02F 1/133605* (2013.01); *G02F 1/133608* (2013.01); *G02F 1/133615* (2013.01)

(56) References Cited

U.S. PATENT DOCUMENTS

| | | | | |
|---|---|---|---|---|
| 7,695,182 B2 * | 4/2010 | Iwasaki | ............... | G02B 6/0091 362/628 |
| 7,826,006 B2 * | 11/2010 | Koganezawa | ..... | G02F 1/133611 349/56 |
| 7,903,196 B2 * | 3/2011 | Koganezawa | ..... | G02F 1/133611 349/56 |
| 8,139,177 B2 * | 3/2012 | Nishizawa | ........ | G02F 1/133305 349/58 |
| 8,646,929 B2 * | 2/2014 | Lee | ...................... | G02B 6/0096 362/297 |
| 9,039,221 B2 * | 5/2015 | Lee | ...................... | G02B 6/0096 362/97.1 |
| 2007/0146569 A1 * | 6/2007 | Nouchi | ................ | G02B 6/0088 349/58 |
| 2008/0303976 A1 * | 12/2008 | Nishizawa | ........ | G02F 1/133305 349/64 |
| 2010/0128198 A1 * | 5/2010 | Kim | ..................... | G02B 6/0088 349/61 |

* cited by examiner

BACKLIGHT MODULE AND LIQUID CRYSTAL DISPLAY DEVICE USING SAME

BACKGROUND OF THE INVENTION

1. Field of the Invention

The present invention relates to the field of liquid crystal displaying, and in particular to a backlight module and a liquid crystal display device using the backlight module.

2. The Related Arts

Liquid crystal displays (LCDs) have a variety of advantages, such as thin device body, low power consumption, and being free of radiation, and are thus of wide applications. Most of the liquid crystal displays that are currently available in the market are backlighting liquid crystal displays, which comprise a liquid crystal display panel and a backlight module. The operation principle of the liquid crystal display panel is that, with liquid crystal molecules interposed between two parallel glass substrates, a plurality of vertical and horizontal tiny wires is arranged between the two glass substrates and application of electricity is selectively made to control the liquid crystal molecules to change direction in order to refract out light emitting from the backlight module for generating images. Since the liquid crystal panel itself does not emit light, light must be provided by the backlight module in order to normally display images. Thus, the backlight module is one of the key components of a liquid crystal display. The backlight modules can be classified in two types, namely a side-edge backlight module and a direct backlight module, according to the position where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal display panel. The side-edge backlight module comprises an LED light bar, serving as a backlight source, which is arranged at an edge of a backplane to be located rearward of one side of the liquid crystal display panel. The LED light bar emits light that enters a light guide plate (LGP) through a light incident face at one side of the light guide plate and is projected out of a light emergence face of the light guide plate, after being reflected and diffused, to pass through an optic film assembly to form a planar light source for the liquid crystal display panel.

Thinning is the current trend of the development of the liquid crystal display devices. Referring to FIG. 1, a conventional thinned liquid crystal display device is shown, comprising: a backlight module 100, a mold frame 300 mounted on the backlight module 100, and a liquid crystal display device 500 mounted on the mold frame 300. The backlight module 100 comprises: a backplane 102, a light guide plate 104 arranged inside the backplane 102, a backlight source 106 arranged inside the backplane 100, and a reflector plate 108 arranged between a bottom plate 122 of the backplane 102 and the light guide plate 104. The light guide plate 104 is directly positioned on the reflector plate 108 so that no gap exists between a bottom surface 142 of the light guide plate 104 and the reflector plate 108 for reducing the thickness of the liquid crystal display device and achieving thinning of the liquid crystal display device.

However, when the surface of the bottom plate 122 of the backplane 102 that faces the reflector plate 108 is not sufficiently smooth (such as having convexity), it may raise up the reflector plate so as to increase the frictional force between the reflector plate 108 and the light guide plate 104, resulting in easy damage of the light guide plate 104.

SUMMARY OF THE INVENTION

An object of the present invention is to provide a backlight module that reduces the thickness of the backlight module, reduces the cost of manufacturing, facilitates the achievement of thinning, and at the same time protects the light guide plate from damage caused by friction between a reflector plate and the light guide plate resulting from surface roughness of a bottom plate to thereby extend the life span of the light guide plate.

Another object of the present invention is to provide a liquid crystal display device that reduces the thickness of the liquid crystal display device, reduces the cost of manufacturing, facilitates the achievement of thinning the liquid crystal display device, and at the same time protects the light guide plate from damage caused by friction between a reflector plate and the light guide plate resulting from surface roughness of a bottom plate to thereby extend the life span of the light guide plate.

To achieve the above objects, the present invention provides a backlight module, which comprises: a backplane, a light guide plate arranged in the backplane, a backlight source arranged in the backplane, and an optic film assembly arranged on the light guide plate. The backplane comprises a bottom plate and a plurality of side plates perpendicularly connected to the bottom plate. The bottom plate has a surface facing the light guide plate and defining a curved surface. The curved surface comprises a curved reflection surface formed thereon.

The curved reflection surface is formed on the curved surface by coating of a material of light reflectivity.

The curved surface is subjected to a polishing operation to form the curved reflection surface.

The light guide plate is directly positioned on the bottom plate and the backlight source is mounted to the side plates of the backplane.

The light guide plate has edges that are directly positioned on the bottom plate at locations corresponding edges of the curved surface.

The present invention also provides a backlight module, which comprises: a backplane, a light guide plate arranged in the backplane, a backlight source arranged in the backplane, and an optic film assembly arranged on the light guide plate, the backplane comprising a bottom plate and a plurality of side plates perpendicularly connected to the bottom plate, the bottom plate having a surface facing the light guide plate and defining a curved surface, the curved surface comprising a curved reflection surface formed thereon;

wherein the curved surface is subjected to a polishing operation to form the curved reflection surface.

The light guide plate is directly positioned on the bottom plate and the backlight source is mounted to the side plates of the backplane.

The light guide plate has edges that are directly positioned on the bottom plate at locations corresponding edges of the curved surface.

The present invention further provides a liquid crystal display device, which comprises: a backlight module, a mold frame mounted on the backlight module, a liquid crystal display panel mounted in the mold frame, and a front bezel mounted on the liquid crystal display panel. The backlight module comprises a backplane, a light guide plate arranged in the backplane, a backlight source arranged in the backplane, and an optic film assembly arranged on the light guide plate.

The backplane comprises a bottom plate and a plurality of side plates perpendicularly connected to the bottom plate. The bottom plate has a surface facing the light guide plate and defining a curved surface. The curved surface comprises a curved reflection surface formed thereon.

The curved reflection surface is formed on the curved surface by coating of a material of light reflectivity.

The curved surface is subjected to a polishing operation to form the curved reflection surface.

The light guide plate is directly positioned on the bottom plate and the backlight source is mounted to the side plates of the backplane.

The light guide plate has edges that are directly positioned on the bottom plate at locations corresponding edges of the curved surface.

The efficacy of the present invention is that the present invention provides a backlight module and a liquid crystal display device using the backlight module. The backlight module has a simple structure and comprises a backplane having a bottom plate that has a surface facing the light guide plate and comprising a curved reflection surface having excellent reflectivity formed thereon to replace a conventionally used reflector plate arranged between the bottom plate of the backplane and the light guide plate so as to reduce the thickness of the liquid crystal display device and also reduce the cost of manufacturing thereby facilitating achievement of thinning of a liquid crystal display device and also preventing the light guide plate from damage caused by friction between the reflector plate and the light guide plate resulting from surface roughness of the bottom plate and thus extending the life span of the light guide plate.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
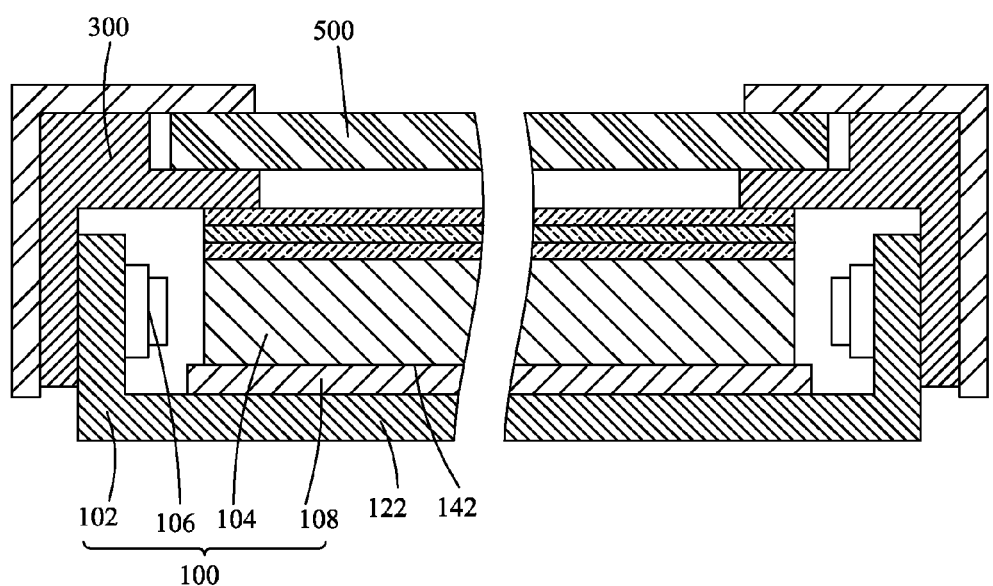
FIG. 1 is a schematic view showing the structure of a conventional liquid crystal display device.
Figure 2:
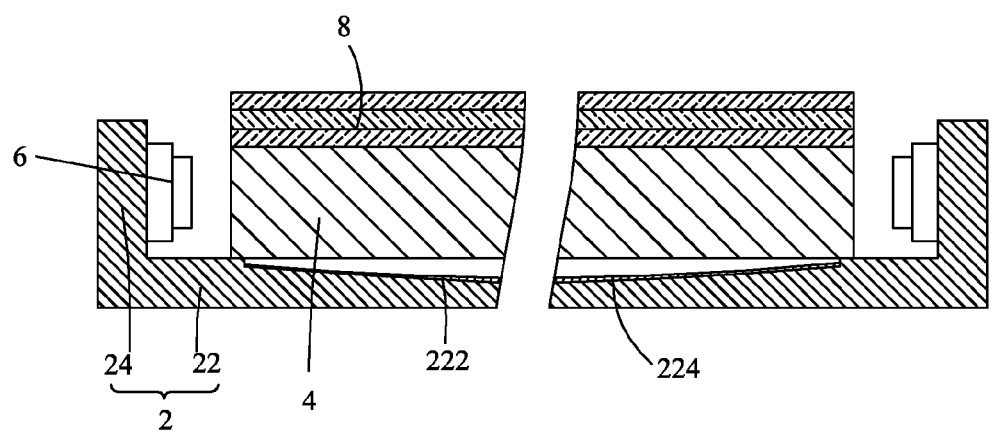
FIG. 2 is a schematic view showing the structure of a backlight module according to the present invention.

Referring to FIG. 2, the present invention provides a backlight module, which has a simple and, specifically, comprises: a backplane 2, a light guide plate 4 arranged in the backplane 2, a backlight source 6 arranged in the backplane 2, and an optic film assembly 8 arranged on the light guide plate 4. The backplane 2 comprises a bottom plate 22 and a plurality of side plates 24 perpendicularly connected to the bottom plate 22. The bottom plate 22 has a surface facing the light guide plate 4 and defining a curved surface 222 and the curved surface 222 comprises a curved reflection surface 224 formed thereon. The light guide plate 4 has edges that are directly positioned on the bottom plate 22 at locations corresponding to edges of the curved surface 222.

The backlight source 6 is mounted to the side plates 24 of the backplane 2 to facilitate achievement of thinning of the backlight module.

The curved reflection surface 224 is formed by coating a layer of reflection material having high reflectivity on the curved surface 222 or is formed by subjecting the curved surface 222 to a polishing operation. Preferably, the curved reflection surface 224 is formed by coating a layer of reflection material having high reflectivity on the curved surface 222. The curved reflection surface 224 has relatively high property of light reflection and can replace a reflector plate that is conventionally arranged between the bottom plate of the backplane and the light guide plate for reflection light emitting from the backlight source and thus, the light guide plate 4 is allowed to be directly positioned on the bottom plate 22 that comprises the curved reflection surface 224, thereby preventing the light guide plate from damage caused by friction between the reflector plate and the light guide plate resulting from surface roughness of a conventional bottom plate and extending the life span of the light guide plate. Further, since the curved reflection surface 224 that is used to replace the conventionally used reflector plate is of a curved form, which provides bettered effect of light reflection, thereby improving light utilization of the backlight source 6 and enhancing the illumination intensity of the backlight module. Further, since the curved reflection surface 224 of the bottom plate 22 replaces the reflector plate, the thickness of the backlight module is reduced and the cost of manufacturing is also reduced so as to facilitate achievement of thinning of the backlight module.

Figure 3:
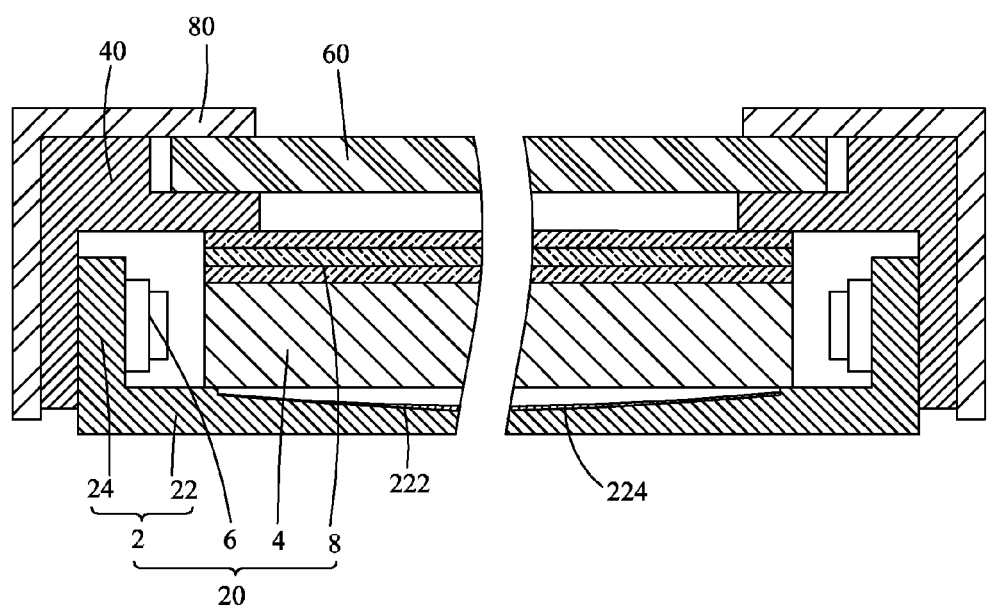
FIG. 3 is a schematic view showing the structure of a liquid crystal display device according to the present invention.

Referring to FIG. 3, the present invention provides a liquid crystal display device, which comprises: a backlight module 20, a mold frame 40 mounted on the backlight module 20, a liquid crystal display panel 60 mounted in the mold frame 40, and a front bezel 80 mounted on the liquid crystal display panel 60. The backlight module 20 comprises a backplane 2, a light guide plate 4 arranged in the backplane 2, a backlight source 6 arranged in the backplane 2, and an optic film assembly 8 arranged on the light guide plate 4. The backplane 2 comprises a bottom plate 22 and a plurality of side plates 24 perpendicularly connected to the bottom plate 22. The bottom plate 22 has a surface facing the light guide plate 4 and defining a curved surface 222 and the curved surface 222 comprises a curved reflection surface 224 formed thereon. The light guide plate 4 has edges that are directly positioned on the bottom plate 22 at locations corresponding to edges of the curved surface 222.

The backlight source 6 is mounted to the side plates 24 of the backplane 2 to facilitate achievement of thinning of the liquid crystal display device.

The curved reflection surface 224 is formed by coating a layer of reflection material having high reflectivity on the curved surface 222 or is formed by subjecting the curved surface 222 to a polishing operation. Preferably, the curved reflection surface 224 is formed by coating a layer of reflection material having high reflectivity on the curved surface 222. The curved reflection surface 224 has relatively high property of light reflection and can replace a reflector plate that is conventionally arranged between the bottom plate of the backplane and the light guide plate for reflection light emitting from the backlight source and thus, the light guide plate 4 is allowed to be directly positioned on the bottom plate 22 that comprises the curved surface 222, thereby preventing the light guide plate from damage caused by friction between the reflector plate and the light guide plate resulting from surface roughness of a conventional bottom plate and extending the life span of the light guide plate. Further, since the curved reflection surface 224 that is used to replace the conventionally used reflector plate is of a curved form, which provides bettered effect of light reflection, thereby improving light utilization of the backlight source 6 and enhancing the illumination intensity of the backlight module 20 so as to improve the displaying performance of the liquid crystal display device. Further, since the curved reflection surface 224 of the bottom plate 22 replaces the reflector plate, the thickness of the backlight module 20 is reduced and the cost of manufacturing is also reduced so as to facilitate achievement of thinning of the liquid crystal display device.

In summary, the present invention provides a backlight module and a liquid crystal display device using the backlight module. The backlight module has a simple structure and comprises a backplane having a bottom plate that has a surface facing the light guide plate and comprising a curved reflection surface having excellent reflectivity formed thereon to replace a conventionally used reflector plate arranged between the bottom plate of the backplane and the light guide plate so as to reduce the thickness of the liquid crystal display device and also reduce the cost of manufacturing thereby facilitating achievement of thinning of a liquid crystal display device and also preventing the light guide plate from damage caused by friction between the reflector plate and the light guide plate resulting from surface roughness of the bottom plate and thus extending the life span of the light guide plate.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising: a backplane, a light guide plate arranged in the backplane and having a flat bottom surface, a backlight source arranged in the backplane, and an optic film assembly arranged on the light guide plate, the backplane comprising a bottom plate and a plurality of side plates perpendicularly connected to the bottom plate, the bottom plate having a flat upper surface facing the bottom surface of the light guide plate and partly concaved to define a curved surface that faces and is spaced from the bottom surface of the light guide plate, the curved surface comprising a curved reflection surface formed thereon and spaced from the light guide plate.

2. The backlight module as claimed in claim 1, wherein the curved reflection surface is formed on the curved surface by coating of a material of light reflectivity.

3. The backlight module as claimed in claim 1, wherein the curved surface is subjected to a polishing operation to form the curved reflection surface.

4. The backlight module as claimed in claim 3, wherein the light guide plate is directly positioned on the bottom plate and the backlight source is mounted to the side plates of the backplane.

5. The backlight module as claimed in claim 4, wherein the light guide plate has edges that are directly positioned on the bottom plate at locations corresponding edges of the curved surface.

6. A backlight module, comprising: a backplane, a light guide plate arranged in the backplane and having a flat bottom surface, a backlight source arranged in the backplane, and an optic film assembly arranged on the light guide plate, the backplane comprising a bottom plate and a plurality of side plates perpendicularly connected to the bottom plate, the bottom plate having a flat upper surface facing the bottom surface of the light guide plate and partly concaved to define a curved surface that faces and is spaced from the bottom surface of the light guide plate, the curved surface comprising a curved reflection surface formed thereon and spaced from the light guide plate;

wherein the curved surface is subjected to a polishing operation to form the curved reflection surface.

7. The backlight module as claimed in claim 6, wherein the light guide plate is directly positioned on the bottom plate and the backlight source is mounted to the side plates of the backplane.

8. The backlight module as claimed in claim 7, wherein the light guide plate has edges that are directly positioned on the bottom plate at locations corresponding edges of the curved surface.

9. A liquid crystal display device, comprising: a backlight module, a mold frame mounted on the backlight module, a liquid crystal display panel mounted in the mold frame, and a front bezel mounted on the liquid crystal display panel, the backlight module comprising a backplane, a light guide plate arranged in the backplane and having a flat bottom surface, a backlight source arranged in the backplane, and an optic film assembly arranged on the light guide plate, the backplane comprising a bottom plate and a plurality of side plates perpendicularly connected to the bottom plate, the bottom plate having a flat upper surface facing the bottom surface of the light guide plate and partly concaved to define a curved surface that faces and is spaced from the bottom surface of the light guide plate, the curved surface comprising a curved reflection surface formed thereon and spaced from the light guide plate.

10. The liquid crystal display device as claimed in claim 9, wherein the curved reflection surface is formed on the curved surface by coating of a material of light reflectivity.

11. The liquid crystal display device as claimed in claim 9, wherein the curved surface is subjected to a polishing operation to form the curved reflection surface.

12. The liquid crystal display device as claimed in claim 11, wherein the light guide plate is directly positioned on the bottom plate and the backlight source is mounted to the side plates of the backplane.

13. The liquid crystal display device as claimed in claim 12, wherein the light guide plate has edges that are directly positioned on the bottom plate at locations corresponding edges of the curved surface.

* * * * *